United States Patent [19]

Mote

[11] Patent Number: 5,094,502
[45] Date of Patent: Mar. 10, 1992

[54] BICYCLE SHIELD DEVICE

[76] Inventor: Michael B. Mote, Rte. 8, Garden Lake Rd. 10 B, Tyler, Tex. 75703

[21] Appl. No.: 375,353

[22] Filed: Jul. 3, 1989

[51] Int. Cl.$^5$ .............................................. B62J 13/00
[52] U.S. Cl. ..................... 296/180.1; 296/78.1; 224/316
[58] Field of Search ............... 296/78.1, 180.1, 180.4, 296/91; 224/30 R, 316, 42.03 B; 280/770, 160.1

[56] References Cited

U.S. PATENT DOCUMENTS

| | | | |
|---|---|---|---|
| 3,609,721 | 9/1972 | Herbert | 296/78.1 |
| 4,010,976 | 3/1977 | Shields | 296/78.1 |
| 4,022,487 | 5/1977 | Leahy | 296/78.1 X |
| 4,066,290 | 1/1978 | Wiegert et al. | 296/78.1 |
| 4,219,142 | 8/1980 | MacPherson | 224/42.03 B X |
| 4,489,973 | 12/1984 | Willey | 296/78.1 |
| 4,524,893 | 6/1985 | Cole | 224/42.03 B X |
| 4,655,497 | 4/1987 | Mallett | 296/78.1 |
| 4,767,037 | 8/1988 | DeLellis | 224/42.03 B |
| 4,790,555 | 12/1988 | Nobile . | |
| 4,813,583 | 3/1989 | Carpenter | 296/78.1 X |

FOREIGN PATENT DOCUMENTS

| | | | |
|---|---|---|---|
| 2612954 | 9/1977 | Fed. Rep. of Germany | 224/316 |
| 3017358 | 12/1981 | Fed. Rep. of Germany | 224/316 |
| 2527530 | 12/1983 | France | 224/316 |

Primary Examiner—Johnny D. Cherry
Assistant Examiner—Joseph D. Pape
Attorney, Agent, or Firm—Ronald B. Sefrna

[57] ABSTRACT

The invention provides a bicycle shield device adapted to be removably connected to a bicycle attached to a carrier for transportation by a highway vehicle so that the shield device is interposed in the airstream immediately ahead of the bicycle, in order to shield the bicycle from impact by foreign objects during such transportation. The device of the invention generally comprises an elongate narrow body to shield the bicycle frame and frame-mounted components, and a pair of opposed arms extending outwardly from the body in generally perpendicular relation to shield the bicycle handlebars and handlebar-mounted components. Various embodiments and adaptations for accommodation of different bicycle-to-carrier attachment systems are also disclosed.

14 Claims, 3 Drawing Sheets

BICYCLE SHIELD DEVICE

FIELD OF THE INVENTION

The present invention generally relates to shield devices, and, in its preferred embodiments, more specifically relates to shield devices intended for use during the transportation of bicycles on a vehicle-mounted carrier rack for the purpose of shielding the bicycle against impact of stones, insects, and other objects.

BACKGROUND OF THE INVENTION

As the sport of bicycling has become more popular, transportation of bicycles for considerable distances on vehicle-mounted racks has become increasingly common, and the incidence of damage caused by impact of stones, insects and other objects against bicycles during such transportation at road speeds has become more widespread. The cost of bicycle frames and components has increased significantly in recent times, and the concern with prevention of damage to such frames and components has increased correspondingly. Prior art approaches to solution of those problems have been limited and have not been fully satisfactory.

One such approach involves fully enclosing the bicycle in a bag of canvas or similar material before mounting the bicycle on the carrier rack. While such enclosures are somewhat effective in deflecting objects from direct impact against the bicycle, or at least minimizing the damage from impact, they are cumbersome and time consuming to use, difficult to clean, and display a pronounced tendency to flap in the wind generated by vehicle motion, substantially increasing wind noise. In addition, the flapping of the material may damage or disturb the adjustment of delicate components of the bicycle.

Another approach has utilized a low profile deflector structure interconnected to the front of the bicycle carrier rack so that the deflector structure extends horizontally across the entire width of the carrier, but extends vertically through only a very small portion of the height of the bicycles to be mounted and transported thereon. This approach is very similar in concept to the known bug deflector devices intended to be mounted on the hood of an automobile in order to at least partially deflect bugs from the windshield of the automobile, as illustrated, by way of example, by U.S. Pat. No. 4,547,013 to McDaniel. While such structures are reasonably effective in deflecting bugs from vehicle windshields, they have not been similarly effective when used with bicycles.

A somewhat similar deflector device designed to be mounted on the roof of a vehicle is also known in the prior art, as illustrated by U.S. Pat. No. 4,206,942 to Nudo, et.al. Such devices generally comprise a rectangular shield mounted on the roof of a vehicle with the long axis of the rectangle across the roof and the short axis extending upward from the roof at an incline toward the rear of the vehicle. As viewed in the direction of air flow against the structures, such roof mounted deflectors are essentially larger versions of the hood mounted bug deflectors, and suffer essentially the same disadvantages in terms of effective shielding of a bicycle to be transported on the roof of the vehicle, as well as some additional disadvantages. The prior art deflectors do not normally extend to a sufficient height to fully shield the bicycle frame structure, and if extended to a sufficient height would create a severe aerodynamic drag highly detrimental to vehicle fuel efficiency. Because of the high wind load such deflectors typically require substantial support structures which leave insufficient space on the roof of most passenger vehicles to mount a bicycle and make the deflector structure heavy and cumbersome.

The prior art further includes a number of devices generally described as farings, designed to be mounted on a bicycle frame for protection of the rider and/or luggage while the bicycle is being ridden at normal pedaling speeds. Examples of such devices may be found in U.S. Pat. No. 4,655,497 to Mallett, U.S. Pat. No. 4,790,555 to Nobile, and U.S. Pat. No. 4,813,583 to Carpenter. While some faring-type devices provide some protection to the bicycle frame and components, any protection is a purely tangential result of their primary purpose and is incomplete at best. The structures of the faring-type devices are not designed to withstand wind loads imposed at vehicle highway speeds in any event.

Therefore, there remains an unfulfilled need for a shield device which effectively and efficiently protects a bicycle mounted on a carrier rack against impact by foreign objects during transportation at passenger vehicle highway speeds.

SUMMARY OF THE INVENTION

The present invention provides a structurally simple, inexpensively produced, and highly effective device to shield a bicycle mounted on, especially, a vehicle roof carrier rack, against impacts from foreign objects during transportation of the bicycle at carrier vehicle highway speeds. The device of the invention generally comprises an elongate body adapted to be removably attached to the bicycle itself or, alternatively, to the carrier rack immediately in front of the bicycle as mounted on the rack, such that the device is in the airstream generated by movement of the transport vehicle.

The length of the body of the device is adapted such that, with the device in place, the upper end of the body of the device extends to a point horizontally aligned with or slightly above the highest point of the bicycle mounted on the carrier rack. The longitudinal axis of the body may be straight, or may be curved through its length to match the curvature of the leading wheel of the bicycle for use with carrier designs in which the bicycle is mounted with the front wheel in place or with the rear wheel toward the front of the transport vehicle. The width of the body is substantially less than the height, being slightly wider than the lateral extension of the bicycle frame and components, other than handlebars, from the longitudinal axis of the frame. The body is curved in cross-sectional configuration in a generally semi-circular arc with the arc centered on the line of air flow against the bicycle during travel of the vehicle. The edges of the body, at the ends of the arc, are preferably slightly flared to outwardly deflect air and create an "envelope" of relatively still air around the bicycle at transport vehicle road speed.

In the case of most multi-geared racing or touring bicycle models, a deraileur component is mounted on the axis of the rear wheel and extends outwardly from the longitudinal axis of the frame a greater distance than other components, except handlebars and pedals, and the pedals are typically at approximately the same height from the ground as the deraileur. In the preferred embodiments of the device, the body is slightly wider through the portion of the body interposed in the air stream in front of the deraileur and pedals, to shield those wider components of the bicycle.

The preferred embodiments of the device further include a pair of arms disposed in opposed positions on either side of the body and extending outwardly therefrom. The arms are typically each formed in an elongate L-shaped longitudinal configuration, generally matching the typical front profile of the handlebars of the bicycle, and are disposed on the body at a height so as to intercede in the air stream immediately in front of the handlebars with the bicycle on the carrier rack and the device in place. The cross-sectional configuration of the arms of the device is curved in similar manner as the curvature of the body, and the edges of the arms are preferably slightly flared for wind deflection.

With a bicycle attached to a vehicle-mounted carrier rack and the device of the invention in place on the bicycle or, alternatively, on the rack, the body of the device is interposed in the windstream to directly shield the bicycle wheels, frame, and frame mounted components, and the arms of the device are similarly interposed to directly shield the handlebars and handlebar-mounted components such as brake levers. Therefore, objects such as stones and insects thrown from the road surface or intersected by the line of travel of the vehicle and bicycle will impact the shielding device of the invention instead of the bicycle, thus shielding the bicycle from such direct impacts. In addition, the flared edges of the body and arms of the device function as airfoils to deflect oncoming air into a curved path extending sufficiently to the rear of the device to encompass the length of the bicycle. As a result of that deflection, an envelope of relatively still air is formed around the bicycle, with a boundary of fast moving air which serves as a barrier to the passage of, especially, relatively light objects such as insects and even raindrops. Therefore, the device of the invention creates a primary barrier against impact by objects directly in the line of vehicle travel, as well as creating, through its airfoil effect, a secondary barrier effective against objects which would impact the bicycle on a line offset from the line of vehicle travel.

The device of the invention is preferably formed as a one piece construction from a lightweight plastic material of sufficient strength and fracture resistance to withstand impact of foreign objects at vehicle road speeds, but the device may be formed of other materials, such as metal, with suitable characteristics. In addition to shielding the bicycle against object impact, the device of the invention is aerodynamically efficient and eliminates much of the air turbulance created by an unshielded bicycle frame and components, thus reducing wind noise and increasing fuel economy. These and other structural and functional features of the preferred embodiments of the device of the invention will be described in more detail with reference to the accompanying drawing figures.

DETAILED DESCRIPTION OF PREFERRED EMBODIMENTS OF THE INVENTION

Figure 2:
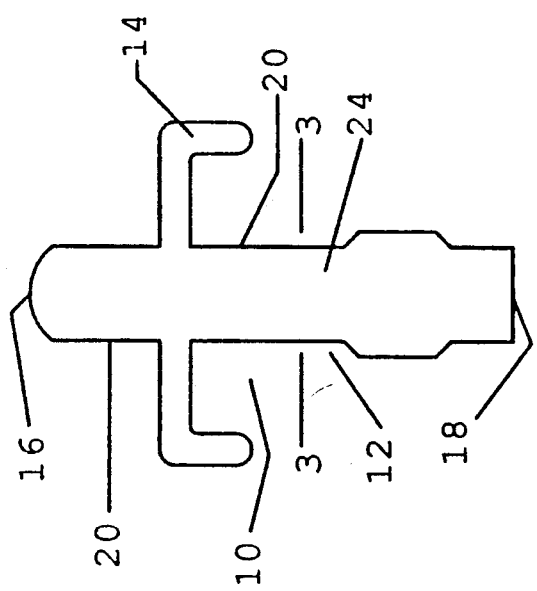
FIG. 2 is a front elevation view of the straight bodied embodiment of the device of the invention illustrated in FIG. 1.
Figure 1:
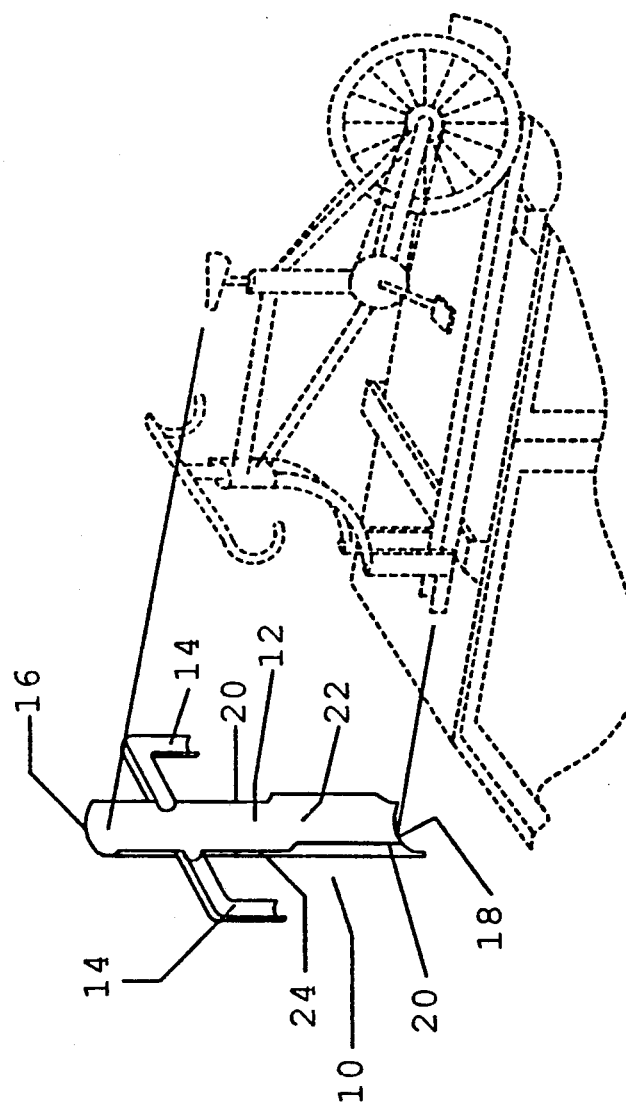
FIG. 1 is a perspective view of a straight bodied embodiment of the device of the invention illustrated in conjunction with a bicycle in place upon a roof-mounted carrier rack.

With reference now to the drawing figures, especially FIGS. 1 and 2, the bicycle shield device of the invention, generally designated by reference numeral 10, will be seen to comprise the two major components of body 12 and lateral arms 14. Body 12 comprises an elongate shell-like structure of substantially greater height than width, with a first or upper end 16 and a second or lower end 18 and with elongate edges 20. The longitudinal axis of body 12, extending from first end 16 to second end 18 through body 12, may be straight, or may be curved through a major portion of its length in order to match the curvature of a bicycle wheel as dictated by the system of attachment of the bicycle to a carrier rack, and as discussed in more detail below. The total height of body 12 along a straight line between respective ends 16 and 18 is preferably equal to or slightly greater than the height of the uppermost point of a bicycle, in place on a vehicle mounted carrier rack, from the vehicle roof or other surface upon which the rack is mounted. For most applications the height of body 12 will be approximately 34 to 36 inches, though it should be readily understood that the height may be adjusted as necessary for various bicycle and carrier rack designs. In the preferred embodiments of the invention the device is provided in standardized heights to correspond to standard bicycle frame sizes, but in an alternative embodiment body 12 may be adapted to be shortened by the user to match a specific bicycle. Adaptation for user adjustment may be achieved by utilizing a material of construction for body 12 which is suitable for cutting perpendicular to the longitudinal axis of body 12 without material fracture, or by forming body 12 with at least one score line across the width of body 12 near either or both ends thereof so that a user may readily break or cut away one or more small segments of body 12 from either or both ends to adjust its length. Such score lines, if used, may be formed during the formation of body 12, or may be incised after such formation.

The width of body 12 is preferably slightly greater than the distance of lateral extension of the bicycle frame and closely mounted components of the bicycle across the longitudinal axis of the bicycle to be shielded. In the preferred embodiments of the device of the invention the width of body 12 is less than the full lateral extension of the bicycle handlebars and handlebar mounted components such as brake levers, which are shielded by arms 14, and of the pedals, but is greater than the full lateral extension of most other components such as chain sprocket, drive gears, shift levers, brake calipers, and deraileur apparatus. With the preferred width relationship body 12 directly shields such components closely mounted to the bicycle frame, which are the components most sensitive to damage oz adjustment disturbance, from impact of objects approaching the bicycle on a line parallel to the line of travel of the transport vehicle upon which the bicycle is carried.

It is preferred that the width of body 12 be minimized, consistent with the function of providing the direct shielding referred to above, in order to minimize its frontal surface area and thus the aerodynamic drag associated with device 10. In typical bicycle construction, components mounted on the upper part of the frame extend outward a lesser distance than components mounted on the lower part of the frame. Accordingly, it is preferred that the width of body 12 be greater through the lower portion of the length of body 12 than through the upper portion, generally as indicated in FIG. 2. Body 12 may be configured as shown in FIG. 2, with the area of increased width intermediate ends 16 and 18, or the area of increased width may extend fully to lower end 18 without departing from the scope of the invention.

Figure 3:
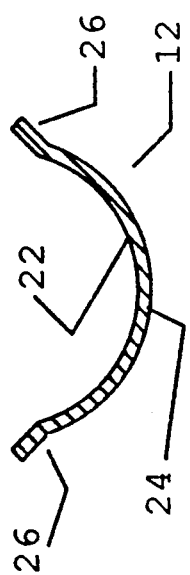
FIG. 3 is a cross-sectional view of the body of the embodiment of the device of the invention illustrated in FIGS. 1 and 2, cut along line 3—3 of FIG. 2.

The cross-sectional configuration of body 12 defines a symmetrical curve as illustrated in FIG. 3, creating a concave inner surface 22 and a convex outer surface 24. During use of device 10, the flow of air impinging on outer surface 24 is smoothly divided to flow over surface 24 past edges 20. In the preferred embodiments of device 10 the curvature is a generally semi-circular arc with the arc centered on the longitudinal axis of the bicycle with device 10 in place thereon, but the curve may alternatively describe other forms, such as a parabolic section, if desired. In a further alternative structure within the scope of the invention, body 12 could be formed with an angular cross-sectional configuration with two generally planar halves intersecting at the longitudinal midline of body 12 centered between edges 20.

Figure 4:
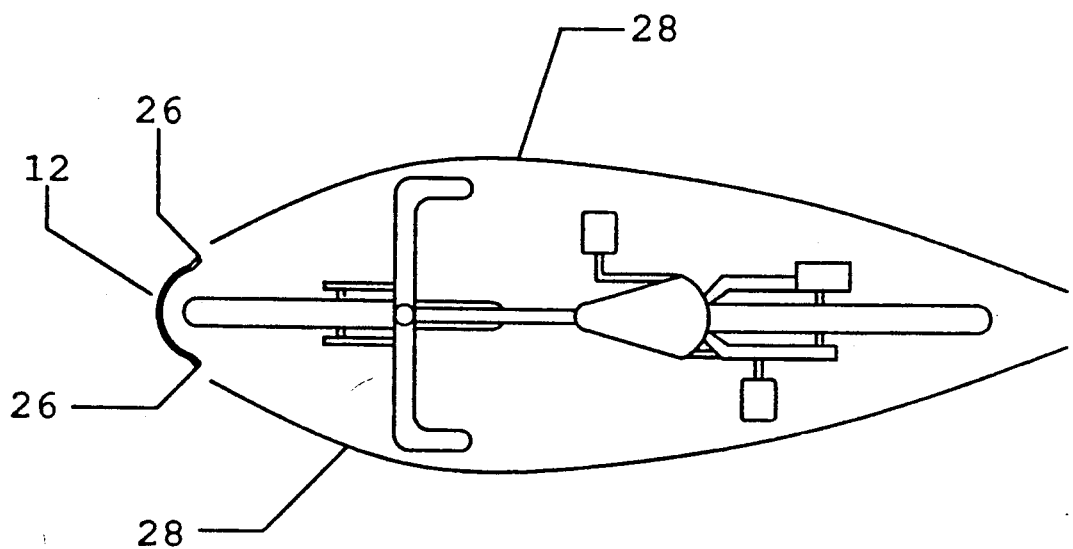
FIG. 4 is a top view of a bicycle as may be mounted on a carrier rack, with a simplified form of the body of the shield device of the invention interposed in an air stream, illustrating the air flow pattern created by the body of the device of the invention with the bicycle transport vehicle moving through the air at transport vehicle highway speed.

In the preferred embodiments of device 10, body 12 is flared outwardly through a flared area 26 extending along and slightly inward from each of edges 20, as illustrated in FIG. 3. Air flowing over outer surface 24 of body 12 is deflected outwardly from the longitudinal axis of the bicycle as the flow of air passes over flared areas 26, creating an envelope of relatively still air through which the bicycle moves as the transport vehicle and attached bicycle move forward along their line of travel. The effective flow path of air around the bicycle created by the combination of convex surface 24 and flared areas 26 is illustrated in FIG. 4, in which the approximate boundary between the area of relatively still air and the more rapidly moving air is indicated by lines 28. Because the bicycle is moving in an envelope or area of relatively still air, wind noise and drag associated with turbulence created by the irregular flow of air over and around the bicycle frame and components is substantially reduced.

Arms 14 of device 10 comprise elongate bodies of the same general cross-sectional configuration as body 12, interconnected at one end to and extending outwardly from body 12 in opposed paired relationship across the longitudinal axis of body 12. In the preferred embodiments of device 10, each of arms 14 is interconnected to body 12 with at least one edge of each arm 14 aligned with a respective edge 20 of body 12. Arms 14 are configured to match the front profile of the handlebars of the bicycle with which device 10 is to be used, and are positioned on body 12 so as to intercede in the air stream immediately in front of such handlebars with device 10 in place and prepared for use. Arms 14 function to directly shield the bicycle handlebars and components mounted thereon, such as brake levers, from foreign objects in the air stream impinging against arms 14 during transportation of the bicycle.

In the preferred embodiments of device 10, arms 14 are firmly interconnected to body 12 in fixed positions, such that the bicycle handlebars nest at least partially within the concavity formed by the curvature of arms 14, and arms 14 are disposed such that the cross-sectional curvature of the arms is centered in the air flow against the arms during transportation of the bicycle. In alternative embodiments, arms 14 may be adapted to be adjustable in longitudinal disposition along the length of body 12 so as to allow the user to adapt their position to accommodate different bicycles. Arms 14 may be made adjustable by means of one or more curved members interconnected between the proximal ends of the two arms, with the curvature of such member or members matching the cross-sectional curvature of body 12 including similarly flared areas 40 along edges 38 thereof, and with the interconnection of arms 14 to body 12 made through such curved member or members by conventional means such as bolts and nuts or snaps.

Device 10 further includes means of attaching the device to the bicycle with which it is to be used or, alternatively, to the bicycle and carrier rack or to the carrier rack alone. It is preferred that device 10 be attached directly to the bicycle, and such attachment means preferably comprise a plurality of elongate straps each interconnected at one end to body 12 and arms 14. In attaching device 10 to a bicycle, device 10 is positioned with the handlebars at least partially nested in arms 14 and body 12 centered immediately in front of the bicycle, at least one strap interconnected to body 12 between its midpoint and lower end 18 is passed around a portion of the bicycle and secured, and at least one strap above the midpoint of device 10 is passed around a portion of the bicycle and secured. The upper attachment means may be a single strap interconnected to body 12 to be passed around, for example, the handlebar stem, or may be a pair of straps with each interconnected to a different one of arms 14 to be passed around the handlebars. The straps may be elastic or non-elastic, and may be secured by any convenient conventional means, such as buckles, snaps, or interlocking hooks and loops.

Alternatively, device 10 may be adapted to be attached to the carrier rack upon which the bicycle is to be carried. In one such approach, lower end 18 of body 12 may be pivotally interconnected to the carrier rack such that device 10 is pivotable forward and backward in the line of travel of the vehicle on which the carrier rack is mounted. With that arrangement, device 10 can be pivoted forward, the bicycle attached to the rack, and device 10 pivoted into its transportation position and secured.

Bicycles are produced in several different styles and handlebar arrangements to accommodate various uses and rider preferences, and bicycle carrier racks are also produced with differing systems of attaching bicycles to the racks. The device of the invention is readily adaptable, within the scope of the invention, for use with different bicycle styles and with different carrier rack attachment systems. Several examples of such adaptations are described below, but it should be understood that other adaptations and combinations of the adaptations used as examples may readily be made from the disclosure provided herein.

Bicycle configurations commonly differ primarily in the configuration and placement of handlebars, with two styles seeming to predominate. The first is generally referred to as a racing or touring style, in which the handle bars extend horizontally from the stem and then curve downward and backward, while in the second style, often referred to as a mountain bike style, the handlebars extend horizontally but have no downward curve. The embodiment of device 10 illustrated in FIGS. 1, 2, and 6 is designed for use with the racing or touring style handlebars, and the embodiment illustrated in FIG. 5 is adapted for the mountain bike style.

The variations in carrier rack systems are more extensive, differing primarily in the orientation of the bicycle on the carrier rack and in whether the bicycle is mounted with the front wheel in place or removed. Various examples, while not exhaustive, include the following: 1. forward-facing, upright, front-wheel-off; 2. forward-facing, upright, front-wheel-on; 3. forward-facing, inverted, front-wheel-on; 4. rear-facing, upright, rear-wheel-on; and 5. rear-facing, inverted, rear-wheel-on. The principal adaptation of device 10 for accommodation of each of the various mounting systems relates to modification of the longitudinal configuration of body 12, though the position of arms 14 on body 12 may also require some adaptation.

Figures 5, 6:
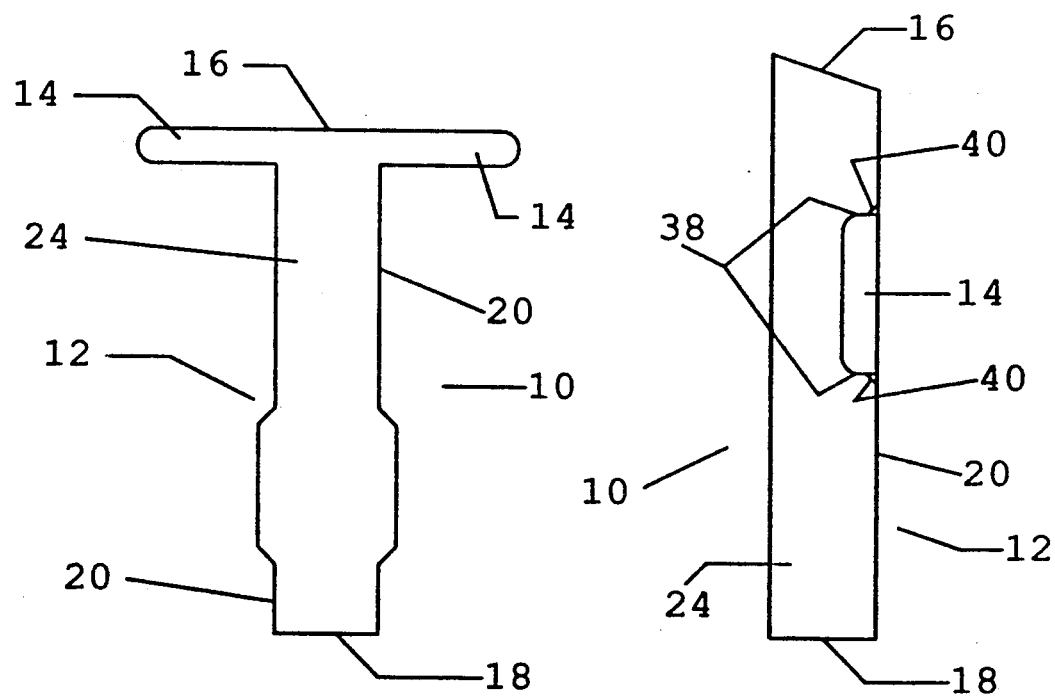
FIG. 5 is a front elevation view of an embodiment of the device of the invention illustrating a frontal configuration adapted for use with mountain bike style handlebar configuration.
FIG. 6 is a side elevation view of an embodiment of the device of the invention adapted for use with a carrier system upon which a bicycle is mounted in a forward-facing, upright, front-wheel-removed configuration.
Figure 7:
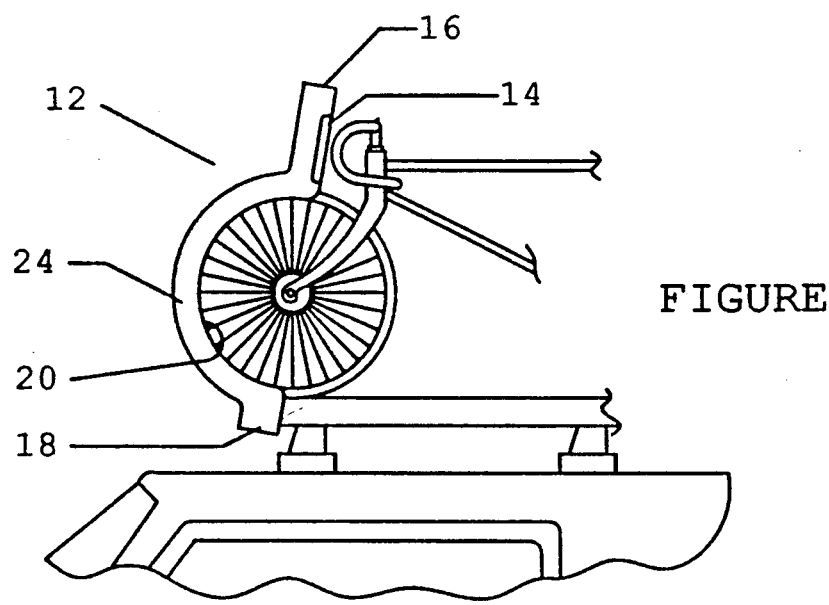
FIG. 7 is a side elevation view of an embodiment of the device of the invention adapted for use with a carrier system upon which a bicycle is mounted in a forward-facing, upright, front-wheel-on configuration.
Figure 8:
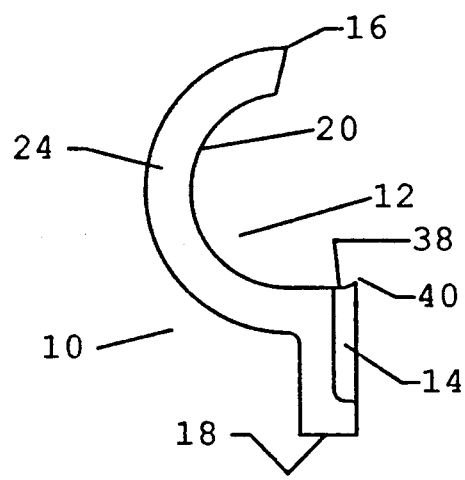
FIG. 8 is a side elevation view of an embodiment of the device of the invention adapted for use with a carrier system upon which a bicycle is mounted in a forward-facing, upside-down, front-wheel-on configuration.

Referring to the drawings, the basic embodiment illustrated in FIGS. 1, 2, and 6 is most suitable for use with the mounting system of example 1. The adaptation illustrated in FIG. 7 is suitable for use with the mounting system of example 2 and with the mounting system of example 4, and the adaptation illustrated in FIG. 8 is suitable for use with the mounting systems of examples 3 and 5.

Figure 9:
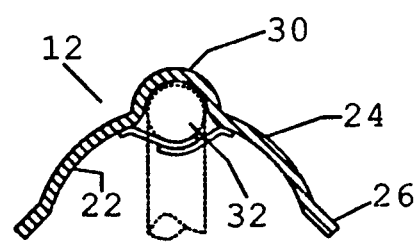
FIG. 9 is a cross-sectional view of an alternative embodiment of the body of the device of the invention, illustrating a first alternative cross-sectional configuration.
Figure 10:
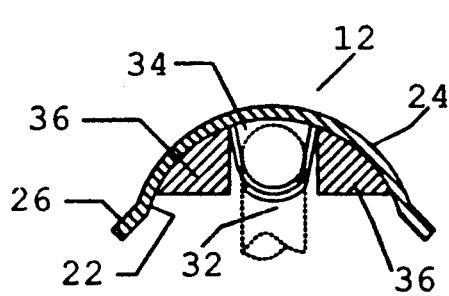
FIG. 10 is a cross-sectional view of an alternative embodiment of the body of the device of the invention, illustrating a second alternative cross-sectional configuration.
Figure 11:
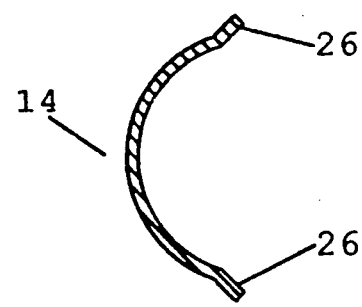
FIG. 11 is a cross-sectional view of a lateral arm of the device of the invention illustrating the cross-sectional configuration thereof.

In order to ensure the stability of the adaptations of device 10 in which body 12 is longitudinally curved to be received over one of the wheels of the bicycle mounted over the carrier rack, and especially with mounting systems in which the bicycle is mounted in a rear-facing configuration where the bicycle handlebars are not in direct contact with arms 14, it is preferred that body 12 be adapted to mate in a nesting relationship with the tire of the bicycle wheel over which it is to be received. In the preferred approach, illustrated in FIG. 9, body 12 includes an elongate dome 30 centered between edges 20 and extending outwardly from surface 24 a sufficient distance to receive a portion of tire 32 in a stable nesting relationship. Dome 30, which extends longitudinally through the portion of body 12 that contacts the tire of the bicycle wheel, is slightly wider than tire 32 so as to allow a portion of tire 32 to be received therein. In an alternative approach, illustrated in FIG. 10, at least one slot 34, to receive a portion of tire 32, is formed along inner surface 22 of body 12 and centered between edges 20 of body 12. Each slot 34 may be formed by interconnection of a pair of formed blocks 36 to surface 22 in opposed separated relationship as shown in FIG. 10, or by other convenient means such as a pair of opposed tabs extending from surface 22 into the concavity of body 12.

The foregoing description of the preferred embodiments of the device of the invention, and of various examples of alternative embodiments and adaptations, is illustrative and not for purposes of limitation of the full scope of the invention. The device of the invention is susceptible to various other modifications and adaptations without departing from the scope and spirit of the invention as claimed.

What is claimed is:

1. A bicycle shield device for protecting a bicycle against the impact of foreign objects during transportation of the bicycle by a transporting vehicle with the bicycle releasably mounted on a carrier rack attached to the transporting vehicle in a configuration in which the plane of the frame of the bicycle is substantially vertical and parallel to the longitudinal axis of the transporting vehicle, comprising an elongate shell-like body to be disposed immediately in front of the bicycle in an air stream created relative to said bicycle by forward movement of the transporting vehicle, said body being of substantially greater length than width, having a longitudinal axis and first and second ends, and said body being curved in cross-section across its width to form a convex outer surface and a concave inner surface, with the length of said body being such that said body extends from the lowest point of said bicycle as mounted on the carrier rack to or slightly beyond the highest point of said bicycle as mounted on the carrier rack, and with the width of said body at its widest point being equal to or less than the total distance from the outer end of the pedal apparatus of the bicycle on one side of the plane of the frame of the bicycle to the outer end of said pedal apparatus on the opposite side of said plane;

a pair of elongate arms each being of substantially greater length then width and having a first end and a second end, disposed in opposed relation across the longitudinal axis of said body and disposed longitudinally on said body such that said arms are in front of the handlebars of the bicycle in the air stream created relative to said handlebars by forward movement of the transporting vehicle with said body disposed in front of said bicycle, each of said arms being curved in cross-section across its width to form a convex outer surface and a concave inner surface, with the longitudinal configuration of each of said arms matching the longitudinal profile of the portion of said handlebars behind said arm in a vertical plane perpendicular to the plane of said bicycle, with the length of each of said arms approximately equal to the length of the longitudinal profile of the portion of said handlebars behind said arm, and with the width of each of said arms slightly greater than the cross-sectional dimension of said handlebars; and means of removably attaching said body immediately in front of said bicycle, with said bicycle mounted on the carrier rack.

2. The shield device of claim 1, wherein the profile of the handlebars in such air stream created relative to such handlebars is L-shaped, and wherein the longitudinal configuration of each of said arms is an L-shape matching the L-shaped handlebar profile.

3. The bicycle shield device of claim 1, wherein said means of removably attaching said body immediately in front of said bicycle comprises a plurality of flexible straps each interconnected at a first end to said body and configured to be passed around a portion of said bicycle and secured at a second end to stabilize said body relative to said bicycle.

4. The bicycle shield device of claim 1, wherein said arms are disposed on the portion of said body between said first end of said body and the longitudinal midpoint of said body, and wherein at least a portion of said body between said longitudinal midpoint and said second end of said body is wider than the portion of said body between said longitudinal midpoint and said first end.

5. The bicycle shield device of claim 1, wherein an elongate narrow strip along each of two opposed elongate edges of said body is flared outwardly from the curvature of said body so as to deflect air moving over the convex outer surface of said body outwardly from the plane of the frame of said bicycle as the air passes over said elongate narrow strip.

6. The bicycle shield device of claim 1, wherein an elongate narrow strip along each of two opposed elongate edges of each of said arms is flared outwardly from the curvature of said arm so as to deflect air moving over the convex outer surface of said arms outwardly from the longitudinal axis of the portion of the handlebars in front of which each respective arm is disposed.

7. The bicycle shield device of claim 1, wherein said longitudinal axis of said body is straight such that the longitudinal configuration of said body is straight.

8. The bicycle shield device of claim 1, wherein said bicycle is mounted on the carrier rack with one of the wheel and tire assemblies of said bicycle nearer the front of the transporting vehicle than other portions of said bicycle, and wherein at least a portion of the longitudinal axis of said body is curved such that the longitudinal configuration of a portion of said body to be disposed in front of said wheel and tire in said airstream is curved to match the curvature of said wheel and tire in the plane of the frame of said bicycle.

9. The bicycle shield device of claim 8, wherein the portion of said body to be disposed in front of said wheel and tire is in direct contact with the respective portion of said tire, and said portion of said body to be disposed in front of said wheel and tire includes an elongate dome extending parallel to the longitudinal axis of said portion of said body outwardly from the convex outer surface thereof and having a concave inner surface in communication with the concave inner surface of said body, such that a portion of said tire is received in the concavity of said dome with said body in place relative to said bicycle on said carrier rack.

10. The bicycle shield device of claim 8, wherein a portion of said wheel and tire are to be received within the concavity formed by the cross-sectional curvature of said body and wherein said portion of said body to be disposed in front of said wheel and tire in said airstream includes one or more elongate slots formed within said concavity with their longitudinal axes parallel to the longitudinal axis of said portion of said body, such that the portion of said tire to be received within said concavity is received within said one or more slots formed therein.

11. The bicycle shield device of claim 1, wherein said arms are disposed on said body intermediate said first and second ends of said body.

12. The bicycle shield device of claim 1, wherein said arms are disposed on said body coincident with said first end of said body.

13. The bicycle shield device of claim 1, wherein said body and said arms are formed of a shape retentive plastic material.

14. The bicycle shield device of claim 1, wherein said body is configured and said arms are configured and disposed on said body such that the portion of said handlebars behind each of said arms with said body removably attached in front of said bicycle on said carrier rack is at least partially received within the concavity formed by the cross-sectional curvature of said arms.

* * * * *